(No Model.)
A. V. CHEVERS.
WIND MUSICAL INSTRUMENT.
No. 373,012. Patented Nov. 8, 1887.
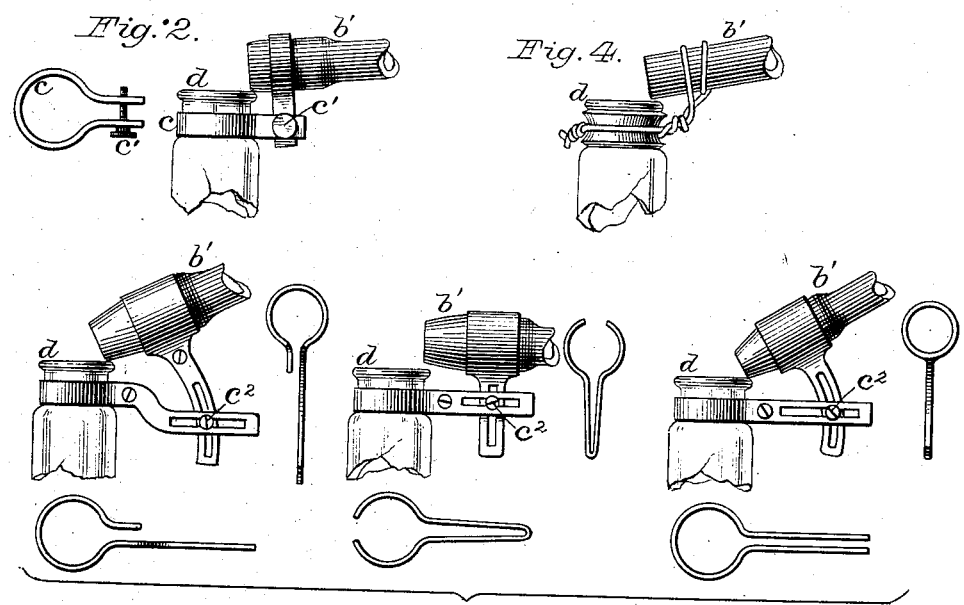
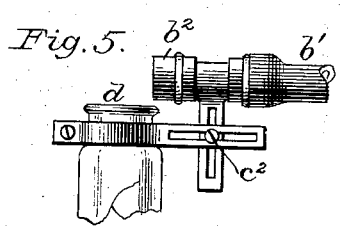
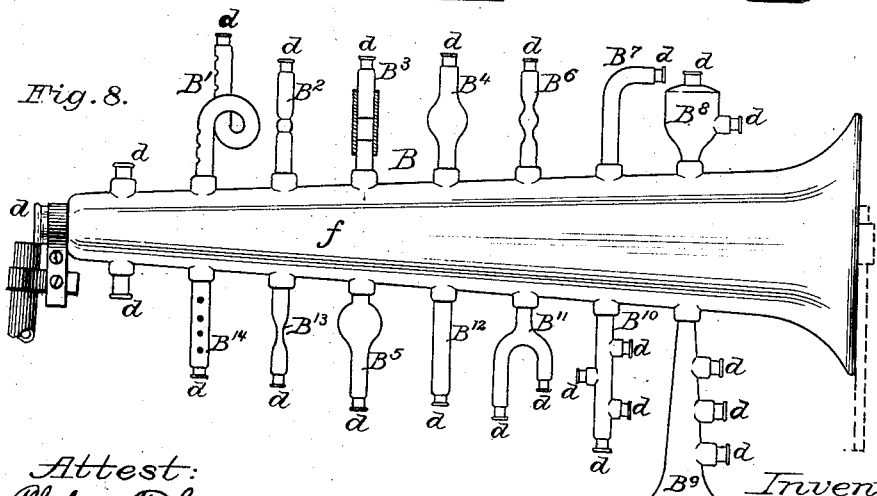
Attest:
Philip F. Larner
Lowell Bartle
Inventor:
Aurion Vila Chevers.
By [Attorney]

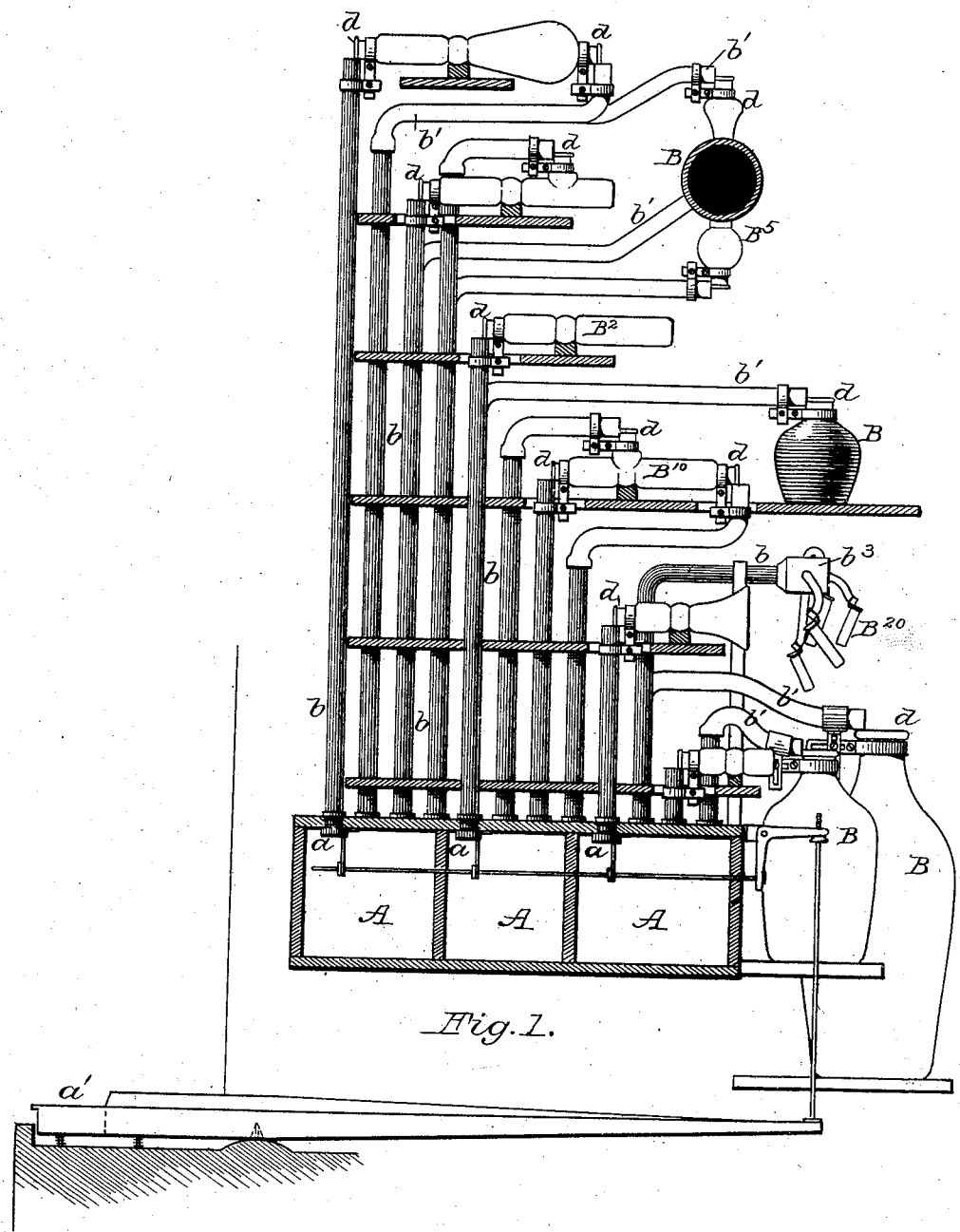

(No Model.)  A. V. CHEVERS.  3 Sheets—Sheet 3.
WIND MUSICAL INSTRUMENT.
No. 373,012.  Patented Nov. 8, 1887.
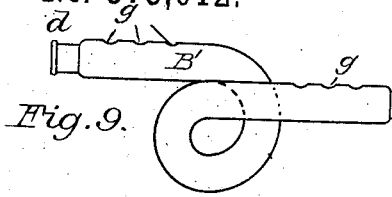
Fig. 9.
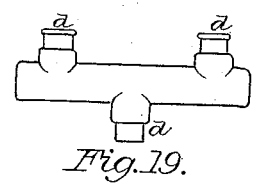
Fig. 18.  Fig. 19.
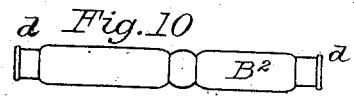
Fig. 10.
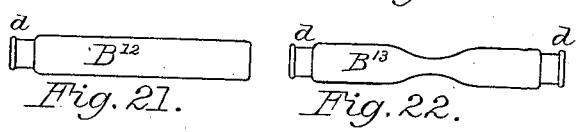
Fig. 21.  Fig. 22.
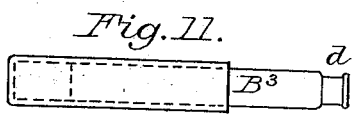
Fig. 11.
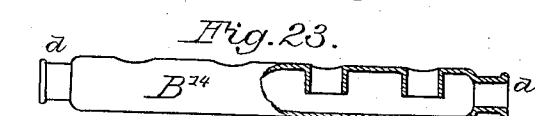
Fig. 23.
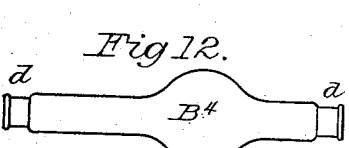
Fig. 12.
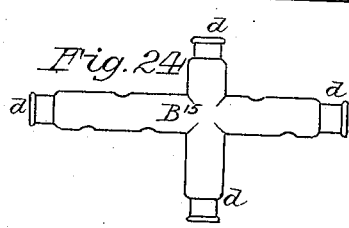
Fig. 24.
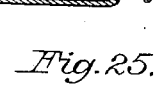
Fig. 25.
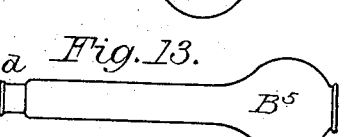
Fig. 13.
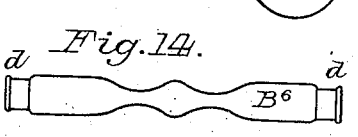
Fig. 14.
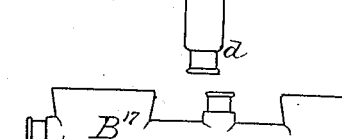
Fig. 26.
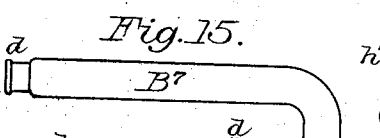
Fig. 15.
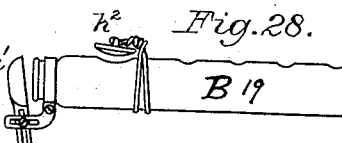
Fig. 28.
Fig. 27.
Fig. 16.  Fig. 20.
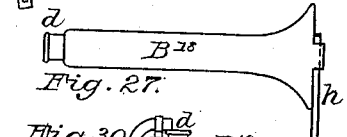
Fig. 30.  Fig. 29.
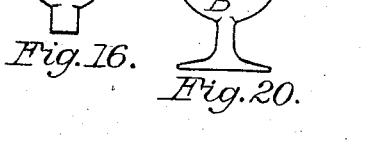
Fig. 17.
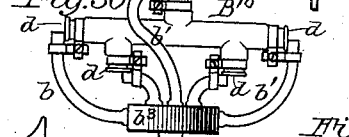
Fig. 31.
Attest:
Philip F. Larner
Howell Bartle
Inventor:
Aurion Vila Chevers
By Wm C Ward
Attorney

UNITED STATES PATENT OFFICE.

AURION VILA CHEVERS, OF PROVIDENCE, RHODE ISLAND.

WIND MUSICAL INSTRUMENT.

SPECIFICATION forming part of Letters Patent No. 373,012, dated November 8, 1887.

Application filed April 22, 1887. Serial No. 235,764. (No model.)

*To all whom it may concern:*

Be it known that I, AURION VILA CHEVERS, of the city and county of Providence, in the State of Rhode Island, have invented certain new and useful Improvements in Wind Musical Instruments; and I do hereby declare that the following specification, taken in connection with the drawings furnished and forming a part of the same, is a clear, true, and complete description of the several features of my invention.

Among the earliest types of musical instruments were those known as "Pandean pipes," consisting of a group of straight pipes or tubes, each closed at one end, of various lengths, secured together parallel and side by side in a row, and with their open ends occupying a straight line. The player, holding the pipes vertically in his hands with their open ends in the plane of and against his lips, produced musical tones by blowing into and across the open ends, and varied the tones by moving the pipes to and fro, the shortest pipe affording the highest tones and the longest the lowest tones. So far as my knowledge extends but one attempt has heretofore been made to embody the Pandean-pipe principle into a keyed instrument—as, for instance, after the manner of pipe-organs—and in that instance to the extent only of producing a mere toy, having little or no practical value as a musical instrument, as will be readily apparent by referring to United States Letters Patent No. 128,506, dated July 2, 1872, in which said prior instrument is shown and described. As a result of a long series of experiments I have discovered that pipes operating on this principle can be operated by suction as well as by forcing air through tubes to the pipes, and also that rich, varied, and novel musical effects can be produced.

One important feature of my invention consists in firmly coupling the mouth of the sounding or musical pipe with or to the end of the air-pipe, whereby their proper operative relations are permanently maintained, and, further, in adjustably coupling them together, whereby they may be varied in position for acquiring the proper tone effects, and then securely maintained in proper position, and, still further, in the use of flexible air-pipes interposed between the sounding-pipes and an air-chest common to many of the sounding-pipes, or between the latter and rigid air-pipes communicating with said air chest.

I have now devised composite sounding-pipes, each having two or more mouths, with which air-pipes are coupled, as described, or one which is made up of two or more sounding-pipes, each of which is coupled to its own air-pipe, whereby true flute-like tones can be obtained, and I have also for the first time grouped two or more of said pipes, or single pipes having several mouth-pieces, to a single air-tube, so that all may respond to the touch of a single key. I have also devised many novel forms of sounding-pipes for use singly or as members or parts of said composite pipes and various means for tuning and adjusting said pipes.

As hereinbefore stated, the tubes of the Pandean pipe are closed at one end, and the same is true of the pipes in the prior keyed instrument to which I have referred, and, although for some effects I use closed pipes, I obtain many specially fine musical effects by the use of straight pipes which are open at both ends, and also by the use of pipes having many mouths or openings, which are never closed, and with others having interior chambers of greater sectional area than adjacent portions of the pipe.

It would be obviously impracticable for me to fully illustrate a complete organ embodying my invention, containing, as it would, hundreds of sounding-pipes, and of necessity having no symmetrical system of arrangement of the pipes, because the latter can only be located and arranged according to convenience and with reference to economy in space, a pipe for producing a high light note, being sometimes placed contiguous to a pipe for producing the heaviest bass note, said pipes being respectively controlled, for instance, by the two keys at the opposite ends of the key-board. It will also be impracticable for me to illustrate such specific variations in pipes, as will be desirable for obtaining certain notes, it being well known that variations in sound will not always result from mere variations in form or dimensions. I can therefore only present in my drawings illustrations of the salient features of my invention, and from the use of which I have obtained satisfactory results, and which will amply serve as guides to others who may have acquired a proper preparatory knowledge of the subject.

After describing the several figures of the drawings in detail, the features deemed novel will be specified in the several clauses of claims hereunto annexed.

Figure 1 illustrates in section portions of several air-chests in an organ, a desirable type of key-action, the valves, and many of my musical pipes connected therewith. Fig. 2, in two views, illustrates one form of couplers for uniting an air-tube with the mouth of musical pipe. Fig. 3, in two views, illustrates three couplers of the same general form. Fig. 4 illustrates the simplest form of coupler used by me. Fig. 5 illustrates a more complex form of coupler. Fig. 6 illustrates a detachable mouth-piece or nipple for use with a musical pipe. Fig. 7 illustrates a nipple for coupling a flexible pipe directly to an air-chest. Fig. 8 in plan view illustrates a composite pipe embodying pipes of various forms in accordance with my invention. Figs. 9 to 30, inclusive, respectfully illustrate novel forms of musical pipes devised and used by me. Fig. 31 illustrates one of my pipes specially arranged for producing flute effects.

Referring to Fig. 1 it will be understood that the air-chests A may be indefinite in number and varied in arrangement, and the valves $a$ may be operated by keys $a'$ in any desired manner without in any manner affecting my invention, and also that air may be forced into said chests, or a partial vacuum induced therein for operating my pipes, although, of course, the latter must be tuned and arranged according to whichever mode of using the air may be desired, inasmuch as forced air will produce a different tone from that resulting from air drawn inward, the pipe being the same in each case.

The air chests are provided with tubes $b$, which may in some cases be wholly rigid or wholly flexible and in others partially rigid and partially flexible. However said tubes may be constructed, they are essentially connected with the musical pipes, so that their relations cannot vary after they have once been set for producing the desired tone or note. In the instrument disclosed in the Letters Patent hereinbefore referred to the air-tubes and the pipes were respectively mounted on different portions of the instrument, and the least warping or twisting of those portions would inevitably derange the relations of the mouths of the tubes and pipes and correspondingly vary the sounds produced. I show various forms of coupler, which I have used with good results. In Fig. 2 I show a simple form of coupler composed of sheet metal bent to form a yoke, $c$. Two of these yokes, with a single clamp-screw, $c'$, constitute a coupler, one yoke encircling an air-tube, $b'$, and the other the neck or mouth $d$ of a musical pipe. In Fig. 3 I show three couplers of the same general form, the yokes having slotted shanks, by means of which and the clamp-screws $c^2$ every possible desirable adjustment can be effected. In Fig. 4 the simplest form of coupler known to me is shown to be composed of soft wire wrapped around the tube and pipe-neck and twisted more or less. By bending the wire the mouths of the tube and pipe can be adjusted with great accuracy, and the tube $b'$ being flexible there is little or no tendency to subsequent derangement. In Fig. 5 two yokes and a set-screw are employed, as in Fig. 2; but the tube $b'$ is not directly clamped, but is coupled to one end of a mouth-piece, $b^2$, which is encircled by one of the yokes. Each of these forms of coupler will serve a good purpose, and they will readily suggest other forms of equal value, it being immaterial how they may be specially constructed, so long as they are capable of so coupling an air-tube and the mouth $d$ of a sounding-pipe that a movement of either will be followed by a corresponding movement of the other and their proper relative positions securely maintained, the adjustable capacity being of prime value in initially arranging the two mouths for producing the desired tone or note, although the range in variation by this adjustment is not very extensive.

In many cases it is desirable that the musical pipes should be provided with detachable mouth-pieces $d'$, as shown in Fig. 6, and these may be inserted into the mouths of the pipes, or they may be large enough to receive the pipes, and in either case they should fit tightly together, and by their adjustment with relation to each other desired variations in tone can be provided for. It often occurs that the entire air-tube should be flexible to admit of a sinuous arrangement in extending from the air-chest to a musical pipe, and in this case the air-chest is provided with short nipples $e$, as shown in Fig. 7, the flexible pipe tightly engaging with the neck of the nipple.

The musical pipes are preferably composed of glass, because of the economy with which they may be produced, and in many cases because of the fine tones which glass affords. They may, however, with good results be composed of porcelain, hard rubber, wood, paper, or metal, and for heavy deep tones I have obtained excellent results with large earthenware pipes. In the use of the term "pipes" I mean to include not only what would technically be deemed pipes, but also air vessels or chambers regardless of their form, so long as they are capable of affording the sounding duty required when a column of air is drawn across or delivered across or partially into their mouths whether they have one or many mouths, and whether they are open from end to end or closed at one end or at both ends and have lateral openings or mouth-pieces.

In Fig. 8 I have illustrated a composite musical pipe, B, embodying many novel forms of pipe, which are not only susceptible of use when combined, as shown, but also separately. In this composite pipe there are twenty-four mouths, d; but this number may be varied indefinitely, according to requirements. No two of these mouths will afford precisely the same note or tone, and either of them can be varied more or less by the adjustment of the mouth of the air-tube co-operating therewith, and they can also be tuned in other ways, as will hereinafter be fully explained. As shown in Fig. 8, but one mouth d is coupled to an air-tube, b', it being understood that each of the other mouths d is to be similarly coupled, and that said air-tubes at their other ends are so coupled to the air-chests of an organ as to be properly controlled by the appropriate finger-key at the key-board. The foundation-pipe f here shown is a long trumpet-shaped pipe, having a mouth, d, at its small end, and at each side it has a series of openings, which in two instances are directly provided with mouth-pieces d, but to each of the others a sounding-pipe is connected; and while all of said sounding-pipes are designated B, I also employ therewith numerals for designating the different forms of pipes.

The pipe B' (also shown on an enlarged scale in Fig. 9) has a single coil, but is substantially of the same diameter between its two ends, and the latter may or may not be contracted. In Fig. 9 this pipe is shown with a series of holes, g, which, by being closed or partially closed, enable tuning to be readily accomplished; but when there are no holes this pipe can be tuned by placing in the coil a proper quantity of liquid, but preferably dry sand or ground glass. Thus providing a Pandean pipe with a chamber capable of receiving and holding foreign matter introduced for tuning purposes is a valuable feature of my invention.

The pipe B² (also shown in Fig. 10) has two straight cylindrical portions abruptly contracted at an intermediate semi-globular chamber. Variations in the location of this chamber with reference to the two ends of the pipe involve variations in tone, and the same is true of the diameter of the pipe and of its mouth-piece d. In Fig. 10 the pipe has two mouth-pieces, and each affords a note or tone peculiar to itself.

The pipe B³ (also similarly shown in Fig. 11) is composed of two straight pipes coupled by a sleeve, so as to provide for tuning by variations in length. In Fig. 11 the pipe is closed at one end, as well as the sleeve; but in the composite pipe, Fig. 8, this pipe is open at both ends.

The pipes B⁴ and B⁵ differ only in proportions, each having a large globular or semi-globular chamber, and these are similarly illustrated in Figs. 12 and 13, it being understood that either may be provided with two mouth-pieces d or with one, and open at both ends or closed at one end. In thus using the terms "globular" and "semi-globular" as applied to these chambers I am not to be understood as restricting myself to chambers of a form strictly within the specific meaning of said terms, although in glass pipes that general form would predominate as an economic matter in construction; but the equivalent of such a chamber, having reference to its function, would not be limited by its form, inasmuch as the object thereof is to provide not only the tuning capacity before referred to, but also for the presence of a considerable body or volume of air of greater sectional area than at other closely-adjacent portions of the pipe, and if the latter were a flattened tube or polygonal the chambers might as well be correspondingly varied in form.

The pipe B⁶ (also shown in Fig. 14) has a central globular or semi-globular chamber; but at each side thereof the tube is gradually contracted. This tube may have one or two mouth-pieces d and be open at one or both ends.

The pipe B⁷ (also shown in Fig. 15) has substantially a uniform interior, but is bent or curved at right angles, and it may have one or more mouth-pieces d and be open at both ends or closed at one end.

The pipe B⁸ (also shown in Fig. 16) is chambered and resembles an urn, and it is provided with two mouth-pieces, each affording a tone of its own, and by closing either the tone of the other would be changed.

The pipe B⁹ (also similarly shown in Fig. 17) has several mouth-pieces d and is trumpet-shaped.

The pipe B¹⁰, (also similarly shown in Fig. 18,) with open ends, each having a mouth-piece, (and in Fig. 19 with closed ends,) is a straight cylindrical pipe having several mouths d, some of which project at right angles to the axis of the pipe.

The pipe B¹¹ (also similarly shown in Fig. 20) is curved and branched in unequal lengths, and each has a mouth-piece d, and in some cases such a pipe has a standard, as shown in Fig. 20, it being understood that in Fig. 8 the two branches communicate with the standard of the pipe, and that the latter opens into the foundation-pipe f.

The pipe B¹² (also shown in Fig. 21) is a simple straight pipe with one mouth-piece d, and when used by itself it may be closed at one end or open at both, and for producing some effects I employ simple straight pipes having a mouth-piece at each end.

The pipe B¹³ is contracted centrally, as similarly shown in Fig. 22, and it may have one or two mouth-pieces and be open at both ends or closed at one end.

The pipe B¹⁴ is a simple straight pipe provided with a series of lateral openings, as also shown in Fig. 23, and sometimes said openings are flanged inwardly, as shown in Fig. 23, and at other times said flanges are not employed, these variations producing variations in tone. The holes can be closed or partially closed for tuning, and the pipe may have one or two mouth-pieces d and be open at but one end or at both ends.

When numerous pipes are thus organized upon a foundation to form a composite pipe, all of the branches communicate with the interior of the pipe $f$, the necks in the latter having various internal dimensions, according to circumstances, and these necks, as well as the mouth-pieces $d$, are sometimes provided with linings or bushings composed of the same material as the pipes, or of other materials capable of resisting undue changes from variations in temperature and moisture.

Various other forms of pipes have been devised and used by me. The pipe $B^{15}$ of Fig. 24 has four mouth-pieces $d$, each affording its own tone. The four arms or branches are of varied length, and one or more of them is provided with lateral holes for tuning or for varying the quality of tone.

In Fig. 25 the pipe $B^{16}$ has a single mouth $d$ and is shaped like a balloon, and is sometimes provided with a standard or base for supporting it in a vertical position.

In Fig. 26 the pipe $B^{17}$ has two air-chambers of goblet form, each having its own standard. These chambers are coupled together by means of a straight pipe having a mouth $d$, and each chamber has a lateral pipe and mouth $d$, and each of these mouths affords its own tone or note, and each chamber can receive and hold matter introduced for tuning.

In Fig. 27 the pipe $B^{18}$ is a straight trumpet-shaped pipe, open at both ends, has a mouth $d$ at one end, and a slide, $h$, is provided for tuning.

In Fig. 28 the pipe $B^{19}$ is a straight pipe having a mouth-piece $d$ at one end, is open at the opposite end, and is provided with an adjustable valve, $h'$, by which the aperture may be controlled for tuning. This pipe has also a lateral opening and a valve, $h^2$, confined in its place by means of wire, which, on being bent, can securely maintain the valve in any desired position and effect the exact degree of closure to produce the desired tuning effect. The mouth $d$, opposite the mouth of the air-tube $b'$, has a soft-metal plate or lip, $h^3$, which can be bent into various positions with relation to the air-tube and to the mouth $d$, and thus by deflecting the air-currents provide for tuning. Any one or more of these tuning appliances can be employed on any one pipe, as occasion may require, and they, with the use of liquid or granulated matter within the pipes and in the chambers therein, and by variations in their mouths by the use of the linings or bushings, hereinbefore referred to, will enable an entire set of tubes to be properly tuned.

In Fig. 29 the pipes $B^{20}$ (like $B^{12}$, Fig. 21) are of the simplest form used by me, being straight pipes closed at one end and each having a single mouth $d$. This is a desirable form for fine high notes. For producing some effects the air-tube $b$ has a chamber, $b^3$, at its top, with a series of branches or flexible tubes, $b'$, and to each of the latter a pipe, $B^{20}$, is attached. As here shown five of said pipes are thus mounted; but a greater or a less number can be used, all of which will be sounded by touching a single key, by which communication with an air-chest is controlled. If all of these pipes be tuned to the same note, desirable volume of sound will be afforded; but as here shown no two pipes are alike, but they would be tuned to produce an effective chord. In dealing with high notes it will be seen that a large number of pipes can thus be grouped and mounted in but little more space than would be required for a single pipe producing the same note in an ordinary pipe-organ. It will also be seen that in a series of these grouped pipes each group may contain, say, two pipes for affording the extremes of an octave, and also other pipes chording therewith, and that the whole may be controlled by a stop in the usual manner, thus enabling effects from the operation of keys singly or one by one, which I believe to be impracticable with any prior system of pipes.

In Fig. 30 I show a single pipe, $B^{10}$, having several mouth-pieces, each being coupled to a flexible air-tube, $b'$, branching from an air-chamber, $b^3$, on top of an air-tube, $b$, thus providing for a chord on touching a single key, as with the separate grouped pipes of Fig. 29.

Now, referring to the pipes of the various novel forms devised by me, I will say that each and every form, as well as each arrangement which I have shown, possesses a value peculiar to itself which can hardly be described, but which will be at once apparent to persons skilled in organ-building on hearing my pipes in practical operation.

With those varieties of my pipes which involve mouths projecting at right angles from the axis of the tube or the main portion thereof I get a variety of flute effects superior to any I have ever heretofore heard in any pipe-organ. The difficulty in describing the several effects available will be illustrated when I say that a pipe in form like that of Fig. 25, $B^{16}$, for instance, may be tuned to correspond to a pipe of the straight variety, Fig. 21, $B^{12}$; but the tone of $B^{16}$ will be fuller and richer than the other, and yet both are desirable separately, and also to operate together at the same time for producing certain desirable effects.

In Fig. 31 one of my pipes is shown with the air-tube $b'$ applied, as before described, to the single mouth $d$, and the several openings $d^2$ are each provided with a hinged cap or valve, $d^3$, having a drop-wire, $d^4$, to be coupled to a finger-key.

As a rule, the chambered pipes afford tones of greater richness than plain straight pipes, and hence said chambered forms are generally preferred.

I have found that any one of my pipes will respond to suction through the air-tubes $b\ b'$; but the same pipe will afford two different tones, according to whether a forced blast or suction is employed. In many cases my flexible air-tubes can be attached directly to the bellows and the air controlled by key-operated mechanism for compressing the tubes, and thereby cutting off or controlling the air supplied to the sounding-pipes.

Although the several pipes shown are cylindrical in cross-section, I obtain good results if they be oval or even polygonal.

It will be seen that by the use of the flexible air-tubes and the couplings by which their ends are securely attached to the mouths of the pipes the latter may occupy any position, whether vertical or inclined; and hence for enlarging the capacities of pipe, or even reed-organs now in use, any desired number of my pipes may be applied thereto, and with suitable stops be made to co-operate with pipes or reeds and be controlled by the same keys.

In such of my pipes as have two or more mouths $d$ full notes and half-notes may be afforded from the one pipe.

I have shown a lip at most of the mouths $d$ of my pipes, and while this is generally desirable in most cases, and specially so in many, I sometimes have no lip, as when specially shrill effects are desired. Variations in the sharpness and curvature of the lip are also desirable.

Referring now again to Fig. 1, it will be seen that the several pipes are designated by such letters of reference as have been employed in the detailed description; and in this connection it is to be understood that the pipes shown can be applied and operated in connection with such valves, stops, &c., as are used in ordinary organs, although but one variety of action has been illustrated.

I will state in conclusion that I have used both glass and metal bushings within the flexible tubes at the points embraced by their clamps for enabling the latter to be firmly applied without any liability of distorting the tube.

Having thus described my invention, I claim as new and desire to secure by Letters Patent—

1. In a musical instrument operated by wind, the combination of a sounding or musical pipe and an air-tube coupled to the mouth of said pipe and substantially at right angles thereto, substantially as described, whereby the relations of said tube and pipe are accurately maintained and a certain note or tone afforded with uniformity.

2. In a musical instrument operated by wind, the combination of a sounding or musical pipe, an air-tube, and an adjustable coupler for uniting the end of said tube to the mouth of the pipe and enabling variations in their relative positions for tuning, substantially as described.

3. In a musical instrument operated by wind, the combination of a sounding or musical pipe and a flexible air-tube coupled to the mouth of said pipe, substantially as described, for delivering air across and into the mouth of said pipe.

4. In a musical instrument operated by wind, the combination of a sounding or musical pipe, an air-tube coupled to the mouth of said pipe and substantially at right angles thereto, and an adjustable deflecting plate or tip on said pipe opposite the mouth of the air-tube, substantially as described, whereby variations in tone can be obtained by varying the position of said deflecting-plate.

5. In a musical instrument operated by wind, the combination, with air-conducting tubes, of a sounding or musical pipe having two or more mouths, each coupled to its appropriate air-tube, which enables air to pass across and partially into said mouth, whereby a variety of tones or notes is afforded from said pipe.

6. In a musical instrument operated by wind, the combination of a sounding or musical pipe containing a globular or semi-globular chamber, as described, and an air-tube coupled substantially at right angles to the mouth of said pipe, substantially as described.

7. In a musical instrument operated by wind, the combination, with a single air-tube, of two or more branch tubes and a sounding or musical pipe coupled to each of said branch tubes, substantially as described.

8. In a musical instrument operated by wind, the combination of a sounding-pipe provided with a detachable and adjustable mouth-piece and an air-tube coupled substantially at right angles to said mouth-piece, substantially as described.

9. In a musical instrument, a Pandean pipe provided with an interior chamber, substantially as described, and adapted to receive matter introduced for tuning the pipe.

10. In a musical instrument, a Pandean pipe, an air-tube coupled to the mouth of said pipe, and a tuning-lip applied to one side of said mouth-piece, substantially as described.

AURION VILA CHEVERS.

Witnesses:
EDWARD FIELD, 2d,
GEORGE A. EMERSON.